Nov. 8, 1960 D. H. HICKMAN 2,959,286
SELF-CLEANING FILTER SYSTEM FOR AUTOMATIC WASHER
Filed Oct. 4, 1957 3 Sheets-Sheet 1

INVENTOR.
DAN H. HICKMAN
BY Ely, Frye & Hamilton
ATTORNEYS

Nov. 8, 1960     D. H. HICKMAN     2,959,286
SELF-CLEANING FILTER SYSTEM FOR AUTOMATIC WASHER
Filed Oct. 4, 1957     3 Sheets-Sheet 2
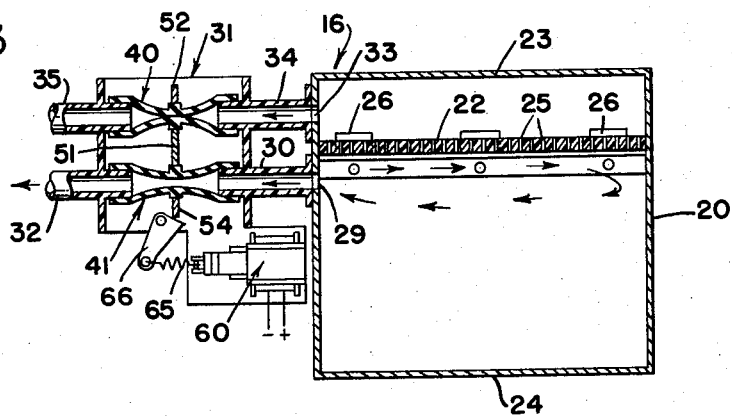
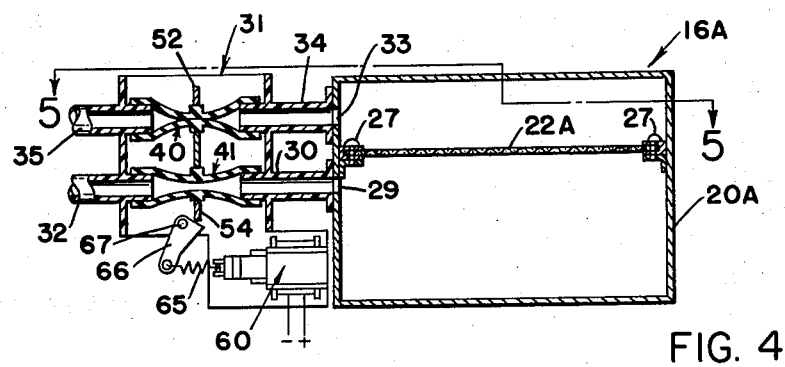
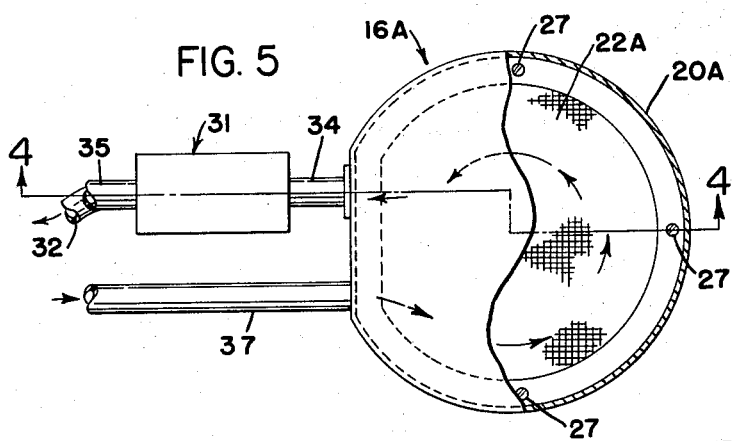
INVENTOR.
DAN H. HICKMAN
ATTORNEYS INVENTOR.
DAN H. HICKMAN
BY Ely, Frye & Hamilton
ATTORNEYS United States Patent Office 2,959,286
Patented Nov. 8, 1960

2,959,286

SELF-CLEANING FILTER SYSTEM FOR AUTOMATIC WASHER

Dan H. Hickman, Mansfield, Ohio, assignor to Gorman-Rupp Industries, Inc., Bellville, Ohio, a corporation of Ohio Filed Oct. 4, 1957, Ser. No. 688,362

4 Claims. (Cl. 210—138)

The invention relates generally to an improved system for filtering the wash and rinse water in an automatic clothes washer, or washer and dryer unit, to remove lint and foreign matter, and more particularly to a filter system in which the filter is contantly automatically cleaned and the filtrant material thereon flushed into the drain.

Certain prior automatic washers have been provided with filters for filtering wash water being recirculated to the tub, but said filters require periodic removal for cleaning and frequently become so clogged as to impede the flow in the line. Also, certain prior automatic washer and dryer units have provided filtering means to filter the water being extracted from the clothes by spinning or drying, or both, but such filters obviously leave a substantial amount of lint on the outer drum around the spinning receptacle, which lint is carried into the wash water for the next batch of clothes. Moreover, such filters also require periodic removal and cleaning.

The object of the present invention is to provide an improved filtering system for an automatic washer or washer and dryer unit, which filters the water continuously during all wash and rinse cycles, and which automatically cleans the filter and flushes the material caught thereby into the drain during all drain cycles.

Another object is to provide an improved filtering system in which the gyratory action of the tub during the extraction cycle aids in flushing material caught by the filter into the drain.

A further object is to provide an improved filtering system in which a single continuously operating pump serves as both a recirculating pump and a drain pump.

A still further object is to provide an improved filtering system in which the filter can be located on the pressure side of the pump without any danger of clogging of the filter, restricting the flow to drain.

These and other objects are accomplished by the improvements comprising the present invention, preferred embodiments of which are shown by way of example in the accompanying drawings, and hereinafter described in detail. Various modifications and changes in details of construction are intended to be embraced within the scope of the invention defined in the appended claims.

In the drawings:

Fig. 3 is a cross section thereof, as on line 3—3 of Fig. 2, showing the solenoid operated valve unit in normal position closing off recirculation to the tub and opening flow to the drain.

Fig. 4 is a similar view of a modified form of filter, as on line 4—4 of Fig. 5.

Fig. 5 is a plan view on line 5—5 of Fig. 4.

Figure 1:
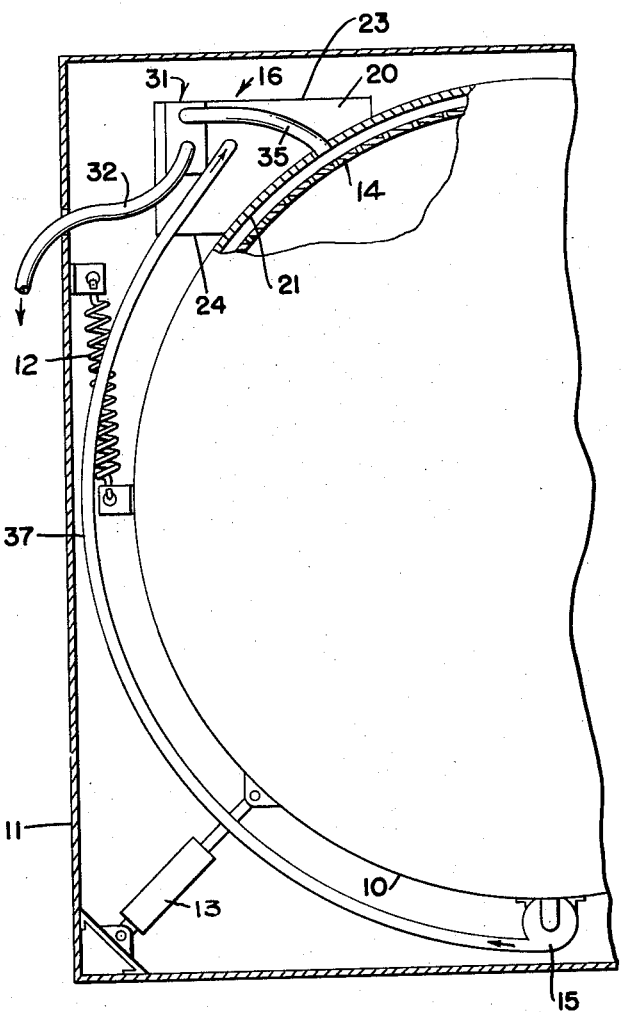
Fig. 1 is a schematic side view of an automatic washer of the rotating drum gyratory type, showing the improved filtering unit mounted directly on the upper part of the tub.

Referring to Fig. 1, the outer receptacle or tub of a rotary drum gyratory washer is indicated at 10, and is yieldably mounted in the cabinet 11 by suitable and well-known resilient supporting means such as springs 12 and shock absorbers 13. A perforate drum 14 for containing the clothes is rotatably mounted within the receptacle and driven by an electric motor (not shown) in the usual manner. Water is withdrawn from the bottom of the receptacle 10 by a continuously running centrifugal pump 15, preferably driven by the drum drive motor, and the water delivered to the filtering unit indicated generally at 16, where it is selectively recirculated by the valve unit to the tub or to the drain during the operating cycle of the machine.

Preferably, the filtering unit 16 is mounted on the tub 10 to obtain a motion from the gyratory action of the tub during the drain cycle, in a manner to be described, but the filtering unit may be mounted on the frame of the cabinet 11 if desired. This latter mounting is more especially adaptable where the tub is of the non-gyratory or agitator type.

Furthermore, the filtering unit may be movably mounted on the cabinet or frame, and operatively connected to a gyratory tub or to any power drive means, such as the receptacle drive motor, for imparting motion to the filtering unit.

Figure 2:
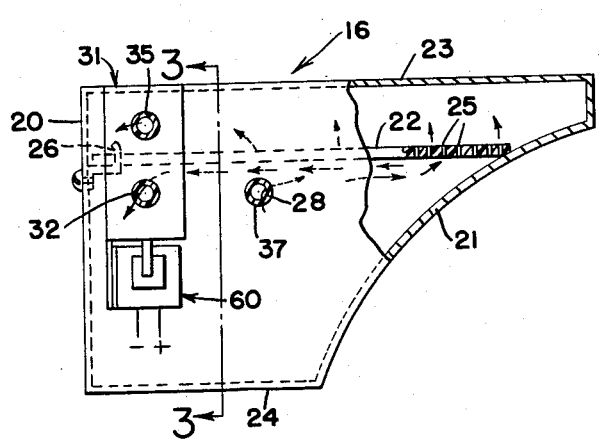
Fig. 2 is an enlarged view of the filtering unit, partly in section.

Referring to Figs. 2 and 3, the filtering unit 16 comprises a closed receptacle 20, which may be rectangular in cross section as shown, and has a curved wall 21 conforming and attached to the receptacle 10. A horizontal filter plate 22 is mounted within the receptacle 20 between the upper wall 23 and lower wall 24, dividing the chamber within the receptacle into two parts.

The filter plate 22 may be about ¼″ thick and of a plastic material, such as a phenolic resin, provided with a multiplicity of closely spaced perforations 25 so as to filter out coarse lint by passing water containing the lint through the filter plate. As shown in Fig. 2, the plate 22 may have a hinged mounting 26 at one end on the receptacle 20, so that water entering the compartment below the filter plate can swing the plate upwardly to bypass the filter if it has become completely clogged. As the coarse lint builds up on plate 22, the lint itself acts as a filter to filter out finer and finer lint during subsequent passes.

In the modified form of filtering unit shown at 16A in Figs. 4 and 5, the receptacle 20A is circular in plan, and has a filter plate or sheet 22A of fine mesh material such as nylon. The filter sheet 22A is secured around its edge on the receptacle by suitable means such as screws 27. Clogging of the filter sheet 22A is minimized by directing the entering water across the face of the filter to cause it to "channel" into paths where the filter face is kept open.

In both forms of filtering units 16 and 16A the port 28 admitting water from the pressure side of the pump 15 to the receptacle is located in the side wall of the receptacle just below the filter plate, and the port 29 leading from the receptacle to the drain is located in the side wall preferably at substantially the same level. The port 29 is connected to a conduit 30 which leads through the valve unit 31 to the drain line 32, located in the side wall of the receptacle below the filter plate. A port 33 is connected to a conduit 34 which leads to the return line 35 to the tub through the valve unit 31. The pump 15 is connected by a conduit 37 to the port 28.

Thus, if the port 29 is open to drain and the port 33 is closed to the tub return line, the water from the pump entering port 28 can flow directly into the drain without passing through the filter. If the drain line is closed and the return line to the tub is open, water from the pump entering port 28 must pass through the filter plate to the port 33 to return to the tub through conduit 35.

Figure 6:
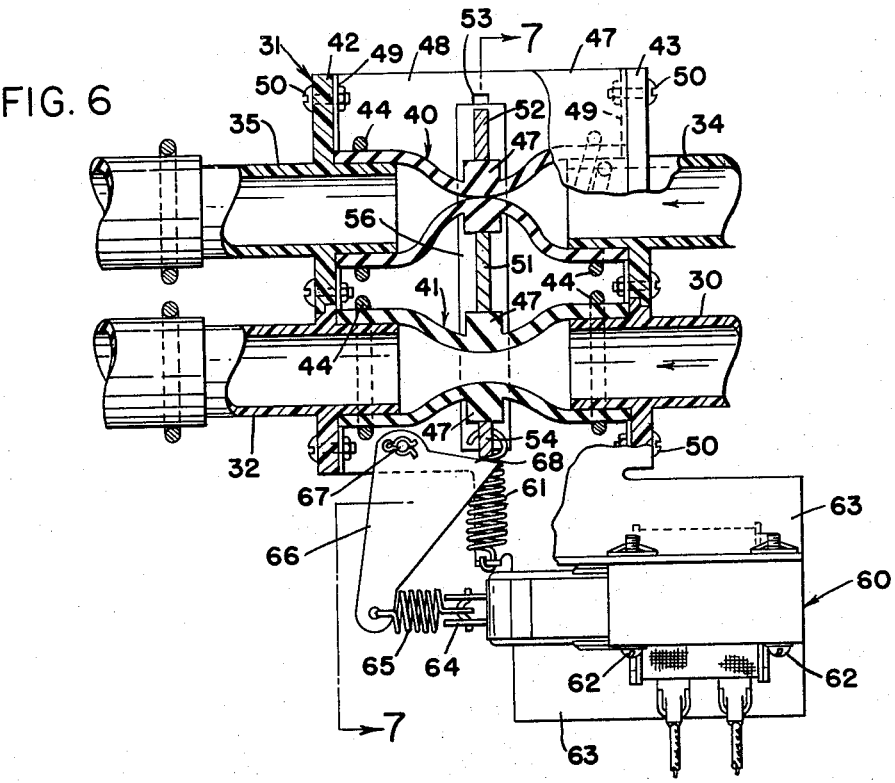
Fig. 6 is an enlarged view similar to Figs. 3 and 4 showing the valve unit in detail.
Figure 7:
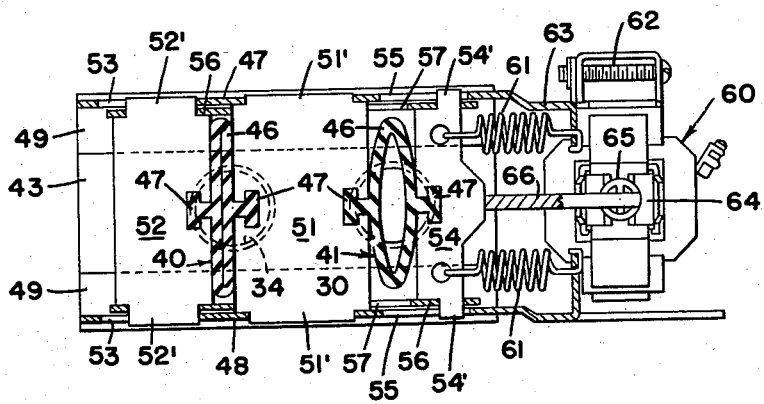
Fig. 7 is a sectional view on line 7—7 of Fig. 6.

The valve unit 31 which selectively controls the flow from the pump is shown in detail in Figs. 6 and 7 and comprises two pinch-tube valves 40 and 41 arranged in parallel relation between two opposed connector plates 42 and 43. The conduits 34 and 35 are formed on the plates 42 and 43, respectively, and extend therethrough in axial alignment with each other. Similarly, the conduits 30 and 32 are formed on the plates 42 and 43, respectively, and extend therethrough in axial alignment with each other below the conduits 34 and 35. Pinch-tube valve 40 connects the inner ends of conduits 34 and 35, and pinch-tube valve 41 connects the inner ends of conduits 30 and 32. The ends of the valves preferably telescope over the ends of the conduits and are clamped thereon by spring wire clamps 44.

The pinch-tube valves 40 and 41 are preferably molded from suitable resilient elastomeric material having high resistance to abrasion and maximum flexing life, and each valve has a transversely flattened portion 46 between its cylindrical ends. Ears 47 project outwardly from both sides of the flattened portion, and are preferably T-shaped in cross section to provide overhanging portions, as shown in Fig. 7.

The flattened portion 46 of each valve is molded normally to have a substantially elliptical passageway therethrough in the open position, as shown by valve 41 in Fig. 7, and means is provided for selectively closing valve 40 when valve 41 is held open and for closing valve 41 when valve 40 is held open. These valves are particularly advantageous in handling fluids containing lint and foreign matter, as in a washing machine, because the smooth interior surfaces of the valves in all positions preclude clogging at the valves.

The connector plates 42 and 43 are mounted in spaced-apart relation by side plates 47 and 48 having angular flanges 49 secured to the inner surfaces of the connector plates by bolts 50. Transverse actuator bars for opening and closing the valves extend between the side plates 47 and 48, preferably midway of the plates, and the bars have tongues projecting into longitudinal slots in the plates. Actuator bar 51 is located between valves 40 and 41 and has tongues 51' fixed in slots in side plates 47 and 48, so that bar 51 is stationary. Actuator bar 52 on the opposite side of valve 40 has tongues 52' slidable longitudinally in slots 53 in the side plates. Actuator bar 54 on the opposite side of valve 41 has tongues 54' longitudinally slidable in slots 55 in the side plates.

The several actuator bars 51, 52 and 53 have T-shaped slots engaging around the ears 47 of the valves, so that if bars 52 and 54 are moved to the left, as viewed in Fig. 7, valve 40 will be opened and valve 41 will be closed. Slotted guide bars 56 connect the actuator bars 52 and 54 so that they move in unison, and the guide bars are slidable along the inner surfaces of the side plates 47 and 48 and fit over the tongues 52' and 54' of the actuator bars 52 and 54. Slots 57 in the guide bars allow them to move relative to bar 51 when the actuator bars 52 and 54 are moved longitudinally to selectively open and close the valves 40 and 41.

The means for moving the actuator bars 52 and 54 to the left as viewed in Fig. 7 is preferably a linkage actuated by a solenoid indicated generally at 60, and the means for returning the bar to its normal position of Fig. 7 may be springs 61 connected between the bar 54 and extensions of the side plates 47 and 48. The solenoid 60 is mounted by bolts 62 on a bracket extension 63 of side plates 47, and the axis of armature 64 of the solenoid is midway between side plates 47 and 48 and parallel thereto. The end of armature 64 is connected to one end of a helical spring 65 and the other end of the spring is connected to the outer end of a bellcrank lever 66 pivoted on a cross shaft 67 secured in the side plates 47 and 48. A cam 68 on lever 66 engages the central portion of the actuator bar 54. The lever 66 is proportioned to substantially decrease the amount of travel of the bar 54 as compared to the travel of the armature so as to minimize the amount of force required to open valve 40 and close valve 41, thereby allowing the use of a relatively small solenoid.

In the normal position of the valves shown in Figs. 6 and 7, the solenoid is de-energized and the actuator bars 52 and 54 are urged to the positions shown by the springs 61 acting on bar 54 and through guide bars 56 on actuator bar 52. When the solenoid is energized the armature 64 causes bellcrank lever 66 to move the bars 52 and 54 to the left, as viewed in Fig. 7, closing valve 41 and opening valve 40.

The construction and operation of the valve unit per se forms no part of the present invention.

In the operation of the improved filtering system as applied to an automatic washer, at the start of the washing cycle the automatic cyclic timer of the machine would energize the solenoid 60, closing the valve 41 to the drain line 32 and opening the valve 40 to the tub return line. The pump 15 is controlled by the timer to run continuously during the entire operation of the machine, and when the valve 41 is closed and valve 40 opened, the pump would recirculate wash water from the bottom of the tub through conduit into the lower filter compartment, and thence through the filter plate and valve 40 back to the tub.

During this cycle lint in wash water from the clothes would be cumulatively caught by the filter plate and would build up on the lower surface thereof. Other foreign matter such a pins, buttons, etc., would be screened out by the filter plate and drop into the lower compartment or sump of the filter tank. At the end of the washing cycle, the timer would deenergize the solenoid, allowing the valves to return to the position shown in Figs. 6 and 7, in which the valve 41 is open to the drain line and valve 40 is closed. As the wash water is pumped from the tub to the drain it passes into the filter tank through port 28, fills the lower compartment, and then flows under the lower surface of the filter plate with a whirling motion to flush the lint thereon out through port 29 and into the drain.

The same action is repeated during each rinsing cycle; first filtering the rinse water to remove any remaining lint, and then as the rinse water is pumped to the drain it flushes the lint off the filtering plate into the drain. After the wash and each rinse cycle, the clothes receptacle within the tub is rotated at relatively high speed to extract a substantial amount of the water from the wet clothes and, during this extraction cycle, the solenoid is de-energized to allow pumping the extracted water into the drain. As the receptacle is rotated the resilient mounting of tub 10 imparts a bouncing or gyratory action to the tub, causing the water in the lower compartment of the filter tank to slosh against and through the filter plate in various directions and greatly aiding in the removal of accumulated lint therefrom.

As shown in Figs. 2 and 3, the lower compartment of the filter tank may be extended downwardly, if desired, to increase the volume of water in the lower compartment and augment the sloshing action during the extraction operation. As previously mentioned, the sloshing motion of the filter tank may be obtained by movably mounting the tank on the cabinet, and providing connecting means transmitting the motion of the tub to the tank, or other means operatively associating the tank with the rotary receptacle or its drive means.

Obviously, the improved filtering system can be applied to an automatic washer or to a washer and dryer unit, and may be used on washers having tubs or receptacles which do not gyrate during the extraction cycle, because in all cases the filter plate would filter during the washing and rinsing cycles, and the accumulated lint would be automatically flushed off the filter plate at the end of each of the washing and rinsing cycles.

The improved system utilizes a single constantly running centrifugal pump for both recirculating and pumping to drain, and eliminates all danger of clogging even though the filter is on the pressure side of the pump.

What is claimed is:

1. A self-cleaning filter system for a washing machine having a tub mounted for gyratory movement during a portion of its operation cycle and a pump for circulating liquid from said tub and a cyclic timer, comprising, a filter tank mounted on said tub having a substantially horizontal filter element dividing the tank into an upper compartment and a lower compartment, a first conduit connecting said pump to said lower compartment, a second conduit connecting said upper compartment to said tub, a third conduit connecting said lower compartment to drain, said first and third conduits communicating with said lower compartment adjacent to said filter element, individual valves in said second and third conduits, and valve operating means for opening and closing said valves, said valve operating means being selectively controlled by said cyclic timer to open the valve in said second conduit while closing the valve in said third conduit and to open the valve in said third conduit while closing the valve in said second conduit when said pump is circulating liquid through said first conduit from said tub.

2. A self-cleaning filter system for a washing machine having a tub mounted for gyratory movement during a portion of its operation cycle and a pump for circulating liquid from said tub and a cyclic timer, comprising, a filter tank mounted on said tub having a substantially horizontal filter element dividing the tank into an upper compartment and a lower compartment, a first conduit connecting said pump to said lower compartment, a second conduit connecting said upper compartment to said tub, a third conduit connecting said lower compartment to drain, said first and third conduits communicating with said lower compartment adjacent to said filter element, individual valves in said second and third conduits, individual valve actuators for opening and closing said valves, and a solenoid to operate said valve actuators, said solenoid being controlled by said cyclic timer to selectively open the valve in said second conduit while closing the valve in said third conduit and to open the valve in said third conduit while closing the valve in said second conduit when said pump is circulating liquid through said first conduit from said tub.

3. A self-cleaning filter system for a washing machine having a cabinet, a tub, a tub drive means, a pump for circulating liquid from said tub and a cyclic timer, comprising, a filter tank movably mounted within said cabinet and having a normally substantially horizontal filter element dividing the tank into an upper compartment and a lower compartment, means operatively connecting said tank with said tub drive means to impart motion to said tank, a first conduit connecting said pump to said lower compartment, a second conduit connecting said upper compartment to said tub, a third conduit connecting said lower compartment to drain, said first and third conduits communicating with said lower compartment adjacent to said filter element, individual valves in said second and third conduits, and valve operating means for opening and closing said valves, said valve operating means being selectively controlled by said cyclic timer to open the valve in said second conduit while closing the valve in said third conduit and to open the valve in said third conduit while closing the valve in said second conduit when said pump is circulating liquid through said first conduit from said tub.

4. A self-cleaning filter system for a washing machine having a cabinet, a tub, a tub drive means, a pump for circulating liquid from said tub and a cyclic timer, comprising, a filter tank movably mounted within said cabinet and having a normally substantially horizontal filter element dividing the tank into an upper compartment and a lower compartment, means operatively connecting said tank with said tub drive means to impart motion to said tank, a first conduit connecting said pump to said lower compartment, a second conduit connecting said upper compartment to said tub, a third conduit connecting said lower compartment to drain, said first and third conduits communicating with said lower compartment adjacent to said filter element, individual valves in said second and third conduits, individual valve actuators for opening and closing said valves, and a solenoid to operate said valve actuators, said solenoid being controlled by said cyclic timer to selectively open the valve in said second conduit while closing the valve in said third conduit and to open the valve in said third conduit while closing the valve in said second conduit when said pump is circulating liquid through said first conduit from said tub.

References Cited in the file of this patent

UNITED STATES PATENTS

| | | |
|---|---|---|
| 238,330 | Barnes | Mar. 1, 1881 |
| 1,876,439 | Whaley | Sept. 6, 1932 |
| 2,439,535 | Wilson | Apr. 13, 1948 |
| 2,454,259 | Shaddy | Nov. 16, 1948 |
| 2,555,725 | Archbold | June 5, 1951 |
| 2,621,505 | Smith | Dec. 16, 1952 |
| 2,810,991 | Mead et al. | Oct. 29, 1957 |
| 2,824,648 | Bear | Feb. 25, 1958 |